(12) United States Patent
Grobys et al.

(10) Patent No.: US 9,278,306 B2
(45) Date of Patent: Mar. 8, 2016

(54) PROCESS FOR CONTACTING TWO PHASES WHOSE CONTACT IS ACCOMPANIED BY HEAT EVOLUTION

(75) Inventors: Mauricio Grobys, Neustadt (DE); Norbert Asprion, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 476 days.

(21) Appl. No.: 12/293,209

(22) PCT Filed: Mar. 16, 2007

(86) PCT No.: PCT/EP2007/052509
§ 371 (c)(1),
(2), (4) Date: Sep. 16, 2008

(87) PCT Pub. No.: WO2007/104800
PCT Pub. Date: Sep. 20, 2007

(65) Prior Publication Data
US 2009/0068078 A1    Mar. 12, 2009

(30) Foreign Application Priority Data
Mar. 16, 2006    (PE) .................................. 06005413.7

(51) Int. Cl.
*B01D 53/62*    (2006.01)
*B01D 53/14*    (2006.01)

(52) U.S. Cl.
CPC ........ *B01D 53/1475* (2013.01); *B01D 53/1456* (2013.01); *B01D 53/1462* (2013.01); *B01D 53/1493* (2013.01); *Y02C 10/06* (2013.01)

(58) Field of Classification Search
CPC ........... B01D 53/1456; B01D 53/1462; B01D 53/1472; B01D 53/1493
USPC ...................... 423/473.1, 226, 228, 229, 220; 210/805; 95/187
IPC ........................................................ B01D 53/14
See application file for complete search history.

(56) References Cited

U.S. PATENT DOCUMENTS

| | | | |
|---|---|---|---|
| 3,034,853 A | * | 5/1962 | Schmidt et al. ............... 423/235 |
| 4,336,233 A | | 6/1982 | Appl et al. |
| 4,999,013 A | | 3/1991 | Zoechbauer et al. |
| 5,603,908 A | | 2/1997 | Yoshida et al. |

(Continued)

FOREIGN PATENT DOCUMENTS

| | | |
|---|---|---|
| EP | 0544515 A1 | 6/1993 |
| JP | 49-119868 | 11/1974 |

(Continued)

OTHER PUBLICATIONS

Nair (Hydrocarbon processing, Aug. 2005, p. 77-82).*

(Continued)

*Primary Examiner* — Jun Li
(74) *Attorney, Agent, or Firm* — Drinker Biddle & Reath LLP

(57) ABSTRACT

A method for bringing into contact two phases which are not completely miscible with one another, and whose contact is accompanied by heat development owing to mass transfer and/or chemical reaction, in which a first phase is introduced into the lower region of a contactor and a second phase is introduced into the upper region of the contactor and passed in countercurrent flow to the first phase in the contactor, a treated first phase and an exhausted second phase being obtained, which comprises recirculating a part of the exhausted second phase to the contactor at least one point situated between the upper region and the lower region. In the preferred embodiment, the first phase is a fluid stream comprising acid gases such as $CO_2$, $H_2S$, $SO_2$, $CS_2$, HCN, COS or mercaptans, and the second phase is an absorption medium which comprises an aqueous solution of at least one organic and/or inorganic base.

22 Claims, 1 Drawing Sheet

(56) References Cited

U.S. PATENT DOCUMENTS

| | | | |
|---|---|---|---|
| 5,782,958 | A | 7/1998 | Rojey et al. |
| 6,165,432 | A | 12/2000 | Rooney |
| 6,207,121 | B1 | 3/2001 | Rooney |
| 6,645,272 | B2 | 11/2003 | Lemaire et al. |
| 6,645,446 | B1 | 11/2003 | Won et al. |
| 7,666,813 | B2 | 2/2010 | Hoefer et al. |
| 2002/0059865 | A1 | 5/2002 | Lemaire et al. |
| 2003/0141223 | A1 | 7/2003 | Wagner et al. |
| 2006/0032377 | A1 | 2/2006 | Reddy et al. |
| 2006/0110300 | A1* | 5/2006 | Mak .............................. 422/190 |

FOREIGN PATENT DOCUMENTS

| | | | |
|---|---|---|---|
| JP | 02-111414 | 4/1990 | |
| JP | 10-202053 | 8/1998 | |
| JP | 2002-525194 | 8/2002 | |
| JP | 2005-254233 | 9/2005 | |
| WO | WO2004080573 | * 8/2004 | ............. B01D 53/14 |
| WO | WO-2004073838 A1 | 9/2004 | |
| WO | WO-2005069965 A2 | 8/2005 | |
| WO | WO-2005097299 A1 | 10/2005 | |
| WO | WO-2006022885 A1 | 3/2006 | |

OTHER PUBLICATIONS

Machine translation of Dipl-ing (EP0221571).*

Kohl, A., et al., "Gas Purification", Chapter 2, 5th Edition, (1997), pp. 40-186.

* cited by examiner

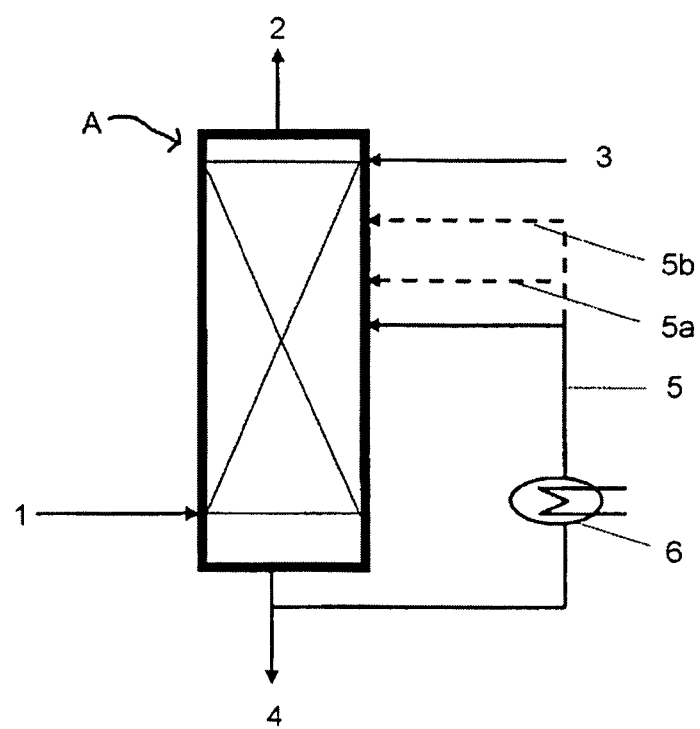

PROCESS FOR CONTACTING TWO PHASES WHOSE CONTACT IS ACCOMPANIED BY HEAT EVOLUTION

This application is a national phase of PCT/EP2007/052509, filed on Mar. 16, 2007 which claims priority to EP 06005413.7 filed Mar. 16, 2006, the entire contents of all are hereby incorporated by reference.

The present invention relates to a method for bringing into contact two phases which are not completely miscible with one another, and whose contact is accompanied by heat development owing to mass transfer and/or a chemical reaction. In particular, the invention relates to a method for removing acid gases from a fluid stream.

In numerous processes of the chemical industry, fluid streams occur which comprise acid gases such as, for example, $CO_2$, $H_2S$, $SO_2$, $CS_2$, HCN, COS or mercaptans as impurities. These fluid streams can be, for example, gas streams, such as natural gas, synthesis gas from heavy oil or heavy residues, refinery gas or reaction gases formed in the partial oxidation of organic materials such as, for example, coal or petroleum, or liquid or liquefied hydrocarbon streams such as LPG (liquefied petroleum gas) or NGL (natural gas liquids). Before these fluids can be transported or further processed, frequently the acid gas content of the fluid must be reduced. $CO_2$ must be removed, for example, from natural gas, since a high concentration of $CO_2$ reduces the calorific value of the gas. In addition, $CO_2$, in combination with the water frequently entrained in fluid streams can lead to corrosion on pipes and fittings.

Removing sulfur compounds from these fluid streams is desirable for different reasons. For example, the sulfur compound content of natural gas must be reduced by suitable treatment measures immediately at the natural gas well, since the sulfur compounds also form acids with the water frequently entrained by the natural gas, which acids have a corrosive action. To transport the natural gas in a pipeline, therefore preset limit values of the sulfurous impurities must be maintained. In addition, numerous sulfur compounds are foul smelling or toxic even at low concentrations.

The reaction gases formed in the oxidation of organic materials, such as for example organic wastes, coal or petroleum, or in the composting of waste materials comprising organic substances must be removed in order to prevent the emission of gases which harm the natural environment or can affect the climate.

To remove acid gases, frequently use is made of scrubbing with aqueous solutions of organic or inorganic bases. When acid gases are dissolved in the absorption medium, ions form with the bases. The absorption medium can be regenerated by expansion to a lower pressure or by stripping, the ionic species reacting back to form acid gases and/or being stripped out by means of steam. After the regeneration process the absorption medium can be reused.

The reaction between the acid gases and the absorption medium is exothermic. The resultant heat is in part taken up by the fluid stream. Under certain circumstances, the fluid stream can exit from the absorber at a temperature which is above the temperature of the regenerated absorption medium. Since for many applications of the treated fluid stream restrictions exist with respect to the maximum permitted temperature, the fluid stream must be additionally cooled. Furthermore, the treated fluid stream carries along more water or absorption medium vapors, the higher the temperature with which it leaves the absorber. Frequently, a downstream dewatering unit of sufficient capacity must be provided. In addition, the energy which is removed by the hot treated liquid stream is lost to the overall method and must be reapplied in the regeneration step. In this manner, the specific energy requirement of the method increases.

WO 2004/073838 discloses a method for removing carbon dioxide from a gas stream using an absorption medium in which the absorption medium is cooled during absorption by heat being transferred to a takeup medium. A suitable takeup medium is, for example, loaded absorption medium from the bottom phase of the absorber. The heat transfer takes place solely by indirect heat exchange using heat exchangers. The loaded absorption medium from the bottom phase of the absorber is not brought into direct contact with the gas or the partially-loaded absorption medium to be treated. This method has the disadvantage that the installation of additional heat exchangers is a not inconsiderable capital expenditure.

The object underlying the invention is to provide a method for bringing into contact two phases whose contact is accompanied by heat development owing to mass transfer and/or a chemical reaction in which the temperature of the treated first phase exiting from the contactor can be restricted and can be converted with low expenditure in terms of apparatus. The object underlying the invention in particular is to provide a method for removing acid gases from a fluid stream which, in addition to the stated advantages, has low specific energy consumption.

The object is achieved by a method for bringing into contact two phases which are not completely miscible with one another, and whose contact is accompanied by heat development owing to mass transfer and/or a chemical reaction, in which a first phase is introduced into the lower region of a contactor and a second phase is introduced into the upper region of the contactor and passed in countercurrent flow to the first phase in the contactor, a treated first phase and an exhausted second phase being obtained, which comprises recirculating a part of the exhausted second phase to the contactor at at least one point situated between the upper region and the lower region.

The first phase is preferably gaseous or liquid; the second phase preferably liquid. The first and second phase can be, for example, a moist gas to be dried and a polyglycol ether, a liquid mixture of hydrocarbons and an amine solution to be freed from sulfur compounds, a gas to be freed from $SO_2$/$NO_x$, and a solution of inorganic bases or an HCl-comprising gas stream and an aqueous solution.

As contactor, any suitable apparatus is suitable in which the two phases can be brought into contact with one another in countercurrent flow. Usually these are columns which, to improve mass transfer and heat exchange, comprise suitable internals, such as trays or packings. The treated first phase is taken off at the top of the contactor, the exhausted second phase at the bottom of the contactor.

A preferred field of application of the invention are methods in which, without recirculation at the contactor head, a temperature difference between the exiting treated first phase and the fed second phase of more than 2° C., in particular more than 5° C., most preferably more than 10° C., occurs.

In a preferred embodiment of the inventive method, the first phase is a fluid stream comprising acid gases such as $CO_2$, $H_2S$, $SO_2$, $CS_2$, HCN, COS and/or mercaptans, in particular $CO_2$, and the second phase is an absorption medium which comprises an aqueous solution of at least one organic and/or inorganic base.

One embodiment therefore relates to a method for removing acid gases from a fluid stream in which the fluid stream is introduced into the lower region of an absorber and a regenerated absorption medium which comprises an aqueous solution of at least one amine is introduced into the upper region of the absorber and conducted in countercurrent stream to the fluid stream in the absorber, a fluid stream freed from acid gases and an absorption medium loaded with acid gases being obtained, which comprises a part of the loaded absorption medium being recirculated to the absorber at at least one point situated between the upper region and the lower region.

In the method according to the invention, a part of the exhausted second phase is recirculated to the contactor at least one point situated between the upper region and the lower region. The recirculated exhausted second phase can be introduced at one or more points in the contactor. The recirculated loaded absorption medium comes into direct contact with the first phase to be treated and mixes with the partially exhausted second phase flowing out in the contactor.

The ratio of the mass flow of the recirculated exhausted second phase (for example the loaded absorption medium) to the mass flow of the second phase introduced in the upper region (for example the regenerated absorption medium) is generally 0.1 to 3.0, preferably 0.25 to 2.0, in particular 0.5 to 1.5. At a smaller recirculated amount, the advantages of the invention do not appear to their full extent. The recirculation of larger amounts leads to an excessively large hydraulic loading of the contactor and does not bring further advantages.

The recirculated exhausted second phase (for example the loaded absorption medium) is added, for example, to a tray of a tray column or via a distributor tray to the underlying packing of a packed column. Preferably, the feed site for at least the majority (more than 50% of the total recirculated amount) is selected in such a manner that the height difference between the feed site of the recirculated exhausted second phase and the introduction site of the first phase is 20 to 80%, in particular 30 to 70%, most preferably 40 to 60% of the height difference between the feed site of the second phase (for example the regenerated absorption medium) and the introduction site of the first phase. If, for example the recirculated loaded absorption medium is introduced at a point nearer to the top of the absorber, in some circumstances, a "breakthrough" of acid gases and an increase of the acid gas concentration in the treated fluid stream which leaves the absorber is observed. If the recirculated loaded absorption medium is introduced at a point nearer to the bottom of the absorber, the advantages of the invention do not appear to their full extent.

In preferred embodiments, all, or a sub quantity of the recirculated exhausted second phase, is cooled prior to introduction into the contactor.

Particular advantages are obtained by the inventive recirculation of exhausted second phase in those cases where the heat capacity of the first phase and the heat capacity of the second phase are comparable. The heat capacity depends on the respective mass flow and the respective specific heat capacity. In preferred embodiments, therefore, the mass flow of the treated first phase m(1'), the specific heat capacity of the treated first phase Cp(1'), the mass flow of the second phase m(2) and the specific heat capacity of the second phase Cp(2) satisfy the equation:

$$0.5 \cdot m(2) \cdot Cp(2) \leq m(1') \cdot Cp(1') \leq 2.0 \cdot m(2) \cdot Cp(2)$$

The inventive method will be described in more detail hereinafter with reference to a preferred embodiment in which the first phase is a fluid stream comprising acid gases and the second phase is an absorption medium which comprises an aqueous solution of at least one organic and/or inorganic base. The invention is not restricted to such a method.

Particular advantages are obtained by the inventive recirculation of loaded absorption medium in those cases where complete removal of acid gases is not sought and the fluid stream freed from acid gases which leaves the absorber has, for example, a residual carbon dioxide concentration of 0.5 to 5 mol %, preferably 1.0 to 2.5 mol %.

The recirculated loaded absorption medium preferably has a temperature of 0 to 80° C., in particular 20 to 60° C. In one embodiment of the inventive method, the recirculated loaded absorption medium is cooled before it is introduced into the absorber. Suitable heat exchangers for this are customary heat exchangers which are operated using a suitable cooling medium.

The regenerated absorption medium entering at the top of the absorber preferably has a temperature of 20 to 110° C., in particular 30 to 60° C.

The bottom phase temperature in the absorber is generally about 20 to 120° C., preferably about 20 to 80° C., particularly preferably 20 to 60° C.

The total pressure (absolute) in the absorber is generally about 1 to 150 bar, preferably about 1 to 100 bar, particularly preferably 1 to 85 bar.

Suitable absorber columns are, for example, dumped-packing columns, structured-packing columns and tray columns. In tray columns, sieve trays, bubble-cap trays or valve trays are installed over which the liquid flows. The vapor is passed through special slots or holes so that a spouted bed is formed. A new equilibrium is established on each of these trays. Dumped-packing columns can be packed with different shaped bodies. Heat exchange and mass transfer are improved by the enlargement of the surface area owing to the usually about 25 to 80 mm large shaped bodies. Known examples are the Raschig ring (a hollow cylinder), Pall ring, Hiflow ring, Intalox saddle and the like. The dumped packings can be introduced into the column in an ordered manner, or else in an irregular manner (as a bed). Materials which come into consideration are glass, ceramic, metal and plastics. Structured packings are a further development of ordered dumped packings. They have a regular shaped structure. By this means it is possible in the case of structured packings to reduce pressure drops in the gas flow. There are various designs of structured packings, for example fabric or metal sheet packings. As material, use can be made of metal, plastic, glass and ceramic.

The substream of the loaded absorption medium which is not recirculated is regenerated in a customary manner by expansion, heating and/or stripping.

For regeneration, the loaded absorption medium is expediently passed into a regeneration column. The regeneration column can likewise be a dumped-packing column, structured-packing column or a tray column. The regeneration column at the bottom has a reboiler, for example a forced circulation evaporator with circulation pump. At the top the regeneration column has an outlet for the released acid gases. Entrained absorption medium vapors are condensed in a condenser and recirculated to the column. In the regeneration column the loaded absorption medium is in part regenerated by expansion and stripping and/or thermally regenerated by direct or indirect heating.

The pressure (absolute) at the top of the regeneration column is generally about 0.5 to 5 bar, preferably about 1 to 3 bar.

The inventive method can also be carried out as a method having two-stage absorption and two-stage regeneration of the absorption medium. In this case a procedure is followed in such a manner that
a) the fluid stream in contact with an absorption medium which comprises an aqueous solution of at least one amine is passed through a first absorption zone in an absorber, a majority of the acid gases being removed, and the fluid stream being passed through a second absorption zone in the absorber, a further amount of the acid gases being removed, b) the loaded absorption medium is passed into a first regeneration zone, a partially regenerated absorption medium being obtained, and a part of the partially regenerated absorption medium being passed into the first absorption zone, c) the other part of the partially regenerated absorption medium is passed into a second regeneration zone, a regenerated absorption medium being obtained, and d) the regenerated absorption medium is passed into the second absorption zone.

Generally, the second absorption zone is arranged above the first absorption zone in an absorber. The fluid stream ascending from the first absorption zone enters into the second absorption zone and the purified fluid stream is taken off at the top of the absorber. The loaded absorption medium running downwards from the second absorption zone enters into the first absorption zone and is taken off together with the loaded absorption medium at the bottom of the absorber. The inventive recirculation of the loaded absorption medium proceeds, in the case of the two-stage absorption, preferably in the central region of the first or second absorption zone, for example at a height of 20 to 80%, preferably 30 to 70%, of the total height of the respective absorption zone.

The fluid stream which is treated by the inventive method is, for example, synthesis gas, in particular synthesis gas for ammonia production. Alternatively it can be natural gas, refinery gas or gas streams in chemical or metallurgical processes. The fluid stream is preferably gaseous.

The absorption media used are aqueous solutions organic and/or inorganic bases, such as amines, potash or metal salts of amino acids and mixtures of said components and also mixtures thereof with phosphoric acid or physical solvents.

Suitable amines are, for example, monoethanolamine (MEA), methylaminopropylamine (MAPA), piperazine, diethanolamine (DEA), triethanolamine (TEA), diethylethanolamine (DEEA), diisopropylamine (DIPA), aminoethoxyethanol (AEE), dimethylaminopropanol (DIMAP) and methyldiethanolamine (MDEA), methyldiisopropanolamine (MDIPA), 2-amino-1-butanol (2-AB) or mixtures thereof. The total amine content is, for example, 10 to 70% by weight, in particular 30 to 60% by weight.

Suitable metal salts of amino acids are, for example, potassium N,N-dimethylglycinate, potassium N-methylalaninate or potassium 2-aminoethanesulfonate.

Suitable physical solvents are sulfolane, N-methylpyrrolidone (NMP), propylene glycol or polyethylene glycol alkyl ether.

Preferred absorption media comprise at least one alkanolamine having 2 to 12 carbon atoms. Particularly preferred absorption media comprise at least one tertiary alkanolamine and preferably an activator in the form of a primary or secondary amine. Preferred activators are saturated, 5- to 7-membered heterocyclic compounds having at least one NH group and if appropriate one further heteroatom selected from an oxygen atom and a nitrogen atom in the ring. Suitable activators are piperazine, 1-methylpiperazine, 2-methylpiperazine, 1-aminoethylpiperazine, morpholine, piperidine. Other preferred activators are selected from methylaminopropylamine, 2-amino-1-butanol, 2-amino-2-methyl-1-propanol (AMP) and aminoethoxyethanol.

The absorption medium described in U.S. Pat. No. 4,336,233 has also proved very particularly expedient. This is an aqueous solution of methyldiethanolamine (MDEA) and piperazine as absorption accelerator or activator (aMDEA®, BASF AG, Ludwigshafen). The wash liquid described there comprises 1.5 to 4.5 mol/l of methyldiethanolamine (MDEA) and 0.05 to 0.8 mol/l, preferably up to 0.4 mol/l, of piperazine.

A further suitable absorption medium comprises an aqueous solution of methyldiethanolamine and methylaminopropylamine.

A further suitable absorption medium comprises an aqueous solution of methyldiethanolamine and aminoethoxyethanol.

A further suitable absorption medium comprises an aqueous solution of methyldiethanolamine and 2-amino-1-butanol.

A further suitable absorption medium comprises an aqueous solution of potassium N,N-dimethylglycinate.

A further suitable absorption medium comprises an aqueous solution of potassium N-methylalaninate.

The invention will be illustrated in more detail on the basis of the accompanying FIG. 1 and the subsequent examples.

FIG. 1 shows diagrammatically the structure of an absorber A for carrying out the inventive method. The absorber A comprises dumped packings or separation trays, in order to effect the mass transfer and heat exchange. Via line 1, the fluid stream to be treated is fed into the absorber A and conducted in countercurrent flow to the regenerated absorption medium which is introduced via the line 3. The fluid stream freed from acid gases leaves the absorber A via the line 2.

A part of the loaded absorption medium taken off at the bottom of the absorber A is recirculated to the absorber A via the optional cooler 6 and the recirculation line 5. The recirculation into the absorber can proceed at a plurality of points, as indicated by the optional lines 5a, 5b. The other part of the loaded absorption medium leaves the absorber A via the line 4 and is fed to the regeneration (not shown).

EXAMPLES

The examples given hereinafter are simulated embodiments of a $CO_2$ removal from a fluid stream. The examples have been calculated using simulation software. The fundamentals of this simulation method are described in N. Asprion, Nonequilibrium Rate-Based Simulation of Reactive Systems: Simulation Model, Heat Transfer, and Influence of Film Discretization, Ind. Eng. Chem. Res.; 2006; 45(6), pp. 2054-2069, 2006.

Example 1

This example is based on the following assumptions:
45% activated MDEA solution
stream 1: $CO_2$ content 1.8 mol %, temperature 30° C., pressure 45 bar (absolute)
stream 3: temperature 50° C.
recycle feed at 50% of height
the phase equilibria were calculated for the activated MDEA solutions using the Pitzer model (K. S. Pitzer, Activity Coefficients in Electrolyte Solutions 2nd ed., CRC-Press, 1991, Chapter 3, Ion Interaction Approach: Theory, the parameters were matched to phase equilibria measurements in the system $CO_2/H_2O/MDEA/$piperazine).

In this example, the amount of loaded absorption medium was varied which is recirculated to the absorber. The results are summarized in the table below (the designation of the streams follows the corresponding reference signs of FIG. 1).

| Stream 5 Mass flow*) [%] | Stream 2 CO$_2$ content**) [relative] | Stream 2 Temperature difference**) (2) − (1) [relative] | Stream 4 Additional heat in the process**) [MW] | Gas volumetric flow rate**) [relative] |
|---|---|---|---|---|
| 0 | 1.00 | 1.00 | 0.0 | 1.00 |
| 10 | 0.97 | 0.93 | 0.3 | 0.99 |
| 25 | 0.87 | 0.85 | 0.7 | 0.99 |
| 50 | 0.65 | 0.72 | 1.3 | 0.98 |
| 100 | 0.38 | 0.55 | 2.1 | 0.97 |
| 150 | 0.28 | 0.47 | 2.4 | 0.96 |
| 200 | 0.24 | 0.42 | 2.7 | 0.95 |
| 300 | 0.20 | 0.36 | 2.9 | 0.95 |
| 400 | 0.18 | 0.33 | 2.9 | 0.95 |

*)based on stream 3
**)relative data, based on a method without recycling

Example 2

This example is based on the following assumptions:
45% activated MDEA solution
stream 1: CO$_2$ content 1.8 mol %, temperature 30° C., pressure 45 bar (absolute)
stream 3: temperature 50° C.
100% recycle In this example the feed site for the recirculated loaded absorption medium was varied. The results are summarized in the table below.

| Stream 5 Height*) [%] | Stream 2 CO$_2$ content) [relative] | Stream 2 Temperature difference) (2) − (1) [relative] | Stream 4 Additional heat in the process) [MW] | Gas volumetric flow rate) [relative] |
|---|---|---|---|---|
| 15 | 0.33 | 0.87 | 0.6 | 1.00 |
| 25 | 0.21 | 0.74 | 1.3 | 0.99 |
| 50 | 0.38 | 0.55 | 2.1 | 0.97 |
| 75 | 3.32 | 0.42 | 2.5 | 0.94 |
| 85 | 8.74 | 0.31 | 2.8 | 0.95 |

*)based on the total height of the absorber
**)relative data, based on a method without recycling Examples 1 and 2 show that the following advantages can be achieved by the invention: a lower CO$_2$ content can be achieved in the purified gas. Alternatively, for the same CO$_2$ specification, the absorber can be selected to be shorter or less absorption medium can be used. The temperature of the purified gas is lower (smaller temperature difference (2)−(1)), as a result, a smaller downstream gas cooling performance is required. This is of importance, in particular in LNG applications, the gas being liquefied after the CO$_2$ removal. The loaded absorption medium is produced at a higher temperature, as a result more heat remains in the process. In the regeneration, correspondingly less energy needs to be supplied, that is the energy efficiency of the process increases. The maximum temperature in the column is lower, as a result of which the effective gas volumetric flow rate is decreased. As a result, the column diameter can be reduced.

Example 3

Flue Gas Scrubber

This example is based on the following assumptions:
30% MEA solution
stream 1: CO$_2$ content 14.7 mol %, temperature 40° C., pressure 1.1 bar (absolute)
stream 3: temperature 40° C.
recycle feed at 50% of height the phase equilibria for the flue gas scrubber using monoethanolamine (MEA) were calculated using the Elektolyt-NRTL model (B. Mock, L. B. Evans, and C.-C. Chen, "Phase Equilibria in Multiple-Solvent Electrolyte Systems: A New Thermodynamic Model," Paper presented at the Boston Summer Computer Simulation Conference, July 1984). The parameters of the model are taken from the following publication: D. M. Austgen, G. T. Rochelle, X. Peng, and C. C. Chen, "A Model of Vapor-Liquid Equilibria in the Aqueous Acid Gas-Alkanolamine System Using the Electrolyte-NRTL Equation," Paper presented at the New Orleans AICHE Meeting, March 1988.

The results are summarized in the table below.

| Stream 5 Mass flow*) [%] | Stream 2 CO$_2$ content**) [relative] | Stream 2 Temperature difference**) (2) − (1) [relative] | Stream 4 Additional heat in the process**) [MW] | Amine loss**) [relative] |
|---|---|---|---|---|
| 0 | 1.00 | 1.00 | 0.0 | 1.00 |
| 10 | 0.99 | 0.94 | 0.2 | 0.94 |
| 25 | 0.97 | 0.86 | 0.4 | 0.87 |
| 50 | 0.96 | 0.72 | 0.8 | 0.74 |
| 100 | 0.96 | 0.46 | 1.4 | 0.52 |
| 150 | 0.96 | 0.20 | 1.9 | 0.32 |
| 175 | 0.99 | 0.06 | 2.1 | 0.22 |

*)based on stream 3
**)relative data, based on a method without recycling

The invention claimed is:

1. A method for bringing into contact a first phase that is a fluid stream comprising acid gases, the acid gases comprising CO$_2$, with a second phase that is an absorption medium which comprises an aqueous solution of at least one organic base,
   wherein the first phase is introduced into the lower region of a contactor and the second phase is introduced into the upper region of the contactor and passed in countercurrent flow to the first phase in the contactor, a treated first phase at a top of the contactor, and a loaded absorption medium at a bottom of the contactor, being obtained, which comprises recirculating a first part of the loaded absorption medium obtained from the bottom of the contactor and directly introducing the recirculated first part to at least one point situated between the upper region and the lower region of the contactor, the first part of the loaded absorption medium being unregenerated, and regenerating the other part of the loaded absorption medium by expansion, heating, and/or stripping,
   in which the height difference between the feed site of the first part of the loaded absorption medium and the introduction site of the first phase is 20 to 70% of the height difference between the feed site of the second phase and the introduction site of the first phase.

2. The method according to claim 1, in which a ratio of the mass flow of the first part of the loaded absorption medium to the mass flow of the second phase is 0.1 to 3.0.

3. The method according to claim 1, in which the height difference between the feed site of the first part of the loaded absorption medium and the introduction site of the first phase is 30 to 70% of the height difference between the feed site of the second phase and the introduction site of the first phase.

4. The method according to claim 1, in which the mass flow of the treated first phase m(1'), the specific heat capacity of the treated first phase Cp(1'), the mass flow of the second phase m(2) and the specific heat capacity of the second phase Cp(2) satisfy the equation:

$$0.5 \cdot m(2) \cdot Cp(2) \leq m(1') \cdot Cp(1') \leq 2.0 \cdot m(2) \cdot Cp(2).$$

5. The method according to claim 1, in which the fluid stream to be treated has a carbon dioxide concentration of 0.5 to 5 mol %.

6. The method according to claim 1, in which the absorption medium comprises an aqueous solution of monoethanolamine (MEA), methylaminopropylamine (MAPA), piperazine, diethanolamine (DEA), triethanolamine (TEA), diethylethanolamine (DEEA), diisopropylamine (DIPA), aminoethoxyethanol (AEE), dimethylaminopropanol (DIMAP) and methyldiethanolamine (MDEA), methyldiisopropanolamine (MDIPA), 2-amino-1-butanol (2-AB), 2-amino-2-methyl-1-propanol (AMP), potassium N,N-dimethylglycinate, potassium N-methylalaninate, potassium 2-aminoethanesulfonate, or mixtures thereof.

7. The method according to claim 6, in which the absorption medium comprises an aqueous solution of methyldiethanolamine and piperazine.

8. The method according to claim 6, in which the absorption medium comprises an aqueous solution of methyldiethanolamine and methylaminopropylamine.

9. The method according to claim 6, in which the absorption medium comprises an aqueous solution of methyldiethanolamine and aminoethoxyethanol.

10. The method according to claim 6, in which the absorption medium comprises an aqueous solution of methyldiethanolamine and 2-amino-1-butanol.

11. The method according to claim 6, in which the absorption medium comprises an aqueous solution of potassium N,N-dimethylglycinate.

12. The method according to claim 6, in which the absorption medium comprises an aqueous solution of potassium N-methylalaninate.

13. The method according to claim 2, in which the height difference between the feed site of the first part of the loaded absorption medium and the introduction site of the first phase is 40 to 60% of the height difference between the feed site of the second phase and the introduction site of the first phase.

14. The method according to claim 2, in which the first part of the loaded absorption medium is cooled prior to the introduction into the contactor.

15. The method according to claim 3, in which the first part of the loaded absorption medium is cooled prior to the introduction into the contactor.

16. The method according to claim 2, in which the mass flow of the treated first phase m(1'), the specific heat capacity of the treated first phase Cp(1'), the mass flow of the second phase m(2) and the specific heat capacity of the second phase Cp(2) satisfy the equation:

$$0.5 \cdot m(2) \cdot Cp(2) \leq m(1') \cdot Cp(1') \leq 2.0 \cdot m(2) \cdot Cp(2).$$

17. The method according to claim 3, in which the mass flow of the treated first phase m(1'), the specific heat capacity of the treated first phase Cp(1'), the mass flow of the second phase m(2) and the specific heat capacity of the second phase Cp(2) satisfy the equation:

$$0.5 \cdot m(2) \cdot Cp(2) \leq m(1') \cdot Cp(1') \leq 2.0 \cdot m(2) \cdot Cp(2).$$

18. A method for bringing into contact a first phase that is a fluid stream comprising acid gases with a second phase that is an absorption medium which comprises an aqueous solution of at least one organic base, the method comprising:
   introducing the first phase into a lower region of a contactor and introducing the second phase into an upper region of the contactor, wherein the first phase and the second phase are mixed and pass in countercurrent flow within the contactor, to provide a treated first phase and a loaded absorption medium;
   recirculating a first portion of the loaded absorption medium directly to the contactor at a point between the upper region and the lower region of the contactor, the point being at a height difference between the feed site of the first portion of the loaded absorption medium and the introduction site of the first phase being 20 to 80% of the height difference between the feed site of the second phase and the introduction site of the first phase,
   wherein the first portion of the loaded absorption medium is not regenerated, and a ratio of the mass flow of the first portion of the loaded absorption medium to the mass flow of the second phase is 0.1 to 3.0; and
   regenerating a second portion of the loaded absorption medium by expansion, heating, and/or stripping.

19. The method according to claim 18, wherein a mass flow of the treated first phase m(1'), the specific heat capacity of the treated first phase Cp(1'), the mass flow of the second phase m(2) and the specific heat capacity of the second phase Cp(2) satisfy the equation:

$$0.5 \cdot m(2) \cdot Cp(2) \leq m(1') \cdot Cp(1') \leq 2.0 \cdot m(2) \cdot Cp(2).$$

20. The method according to claim 18, wherein the first phase fluid stream includes carbon dioxide concentration of 0.5 to 5 mol %.

21. The method according to claim 18, in which the absorption medium comprises an aqueous solution that includes methyldiethanolamine and at least one other amine selected from the group consisting of piperazine, methylaminopropylamine, aminoethoxyethanol and 2-amino-1-butanol.

22. The method according to claim 18, in which the absorption medium comprises an aqueous solution including an amine salt selected from potassium N,N-dimethylglycinate or potassium N-methylalaninate.

* * * * *